US012663542B2

(12) United States Patent
Hu et al.

(10) Patent No.: US 12,663,542 B2
(45) Date of Patent: *Jun. 23, 2026

(54) ONLINE LIDAR INTENSITY NORMALIZATION

(71) Applicant: Aurora Operations, Inc., Pittsburgh, PA (US)

(72) Inventors: Xiaoyan Hu, Redmond, WA (US); Baoan Liu, Pittsburgh, PA (US)

(73) Assignee: AURORA OPERATIONS, INC., Pittsburgh, PA (US)

( * ) Notice: Subject to any disclaimer, the term of this patent is extended or adjusted under 35 U.S.C. 154(b) by 981 days.

This patent is subject to a terminal disclaimer.

(21) Appl. No.: 17/889,865

(22) Filed: Aug. 17, 2022

(65) Prior Publication Data

US 2022/0404500 A1       Dec. 22, 2022

Related U.S. Application Data

(63) Continuation of application No. 16/220,336, filed on Dec. 14, 2018, now Pat. No. 11,422,260.

(Continued)

(51) Int. Cl.
G01S 17/87          (2020.01)
G01S 7/48           (2006.01)
(Continued)

(52) U.S. Cl.
CPC ........... G01S 17/87 (2013.01); G01S 7/4804 (2013.01); G01S 7/497 (2013.01); G01S 17/06 (2013.01); G01S 17/89 (2013.01); G01S 17/931 (2020.01)

(58) Field of Classification Search
None
See application file for complete search history.

(56)            References Cited

U.S. PATENT DOCUMENTS

2017/0193312 A1    7/2017  Ai et al.
2017/0227647 A1*   8/2017  Baik ..................... G01S 7/4802
(Continued)

OTHER PUBLICATIONS

Ai, Chengbo, and Yichang James Tsai. "An automated sign retroreflectivity condition evaluation methodology using mobile LIDAR and computer vision." Transportation Research Part C: Emerging Technologies 63 (2016): 96-113. (Year: 2016).*
(Continued)

*Primary Examiner* — Luke D Ratcliffe
(74) *Attorney, Agent, or Firm* — Dority & Manning, P.A

(57)            ABSTRACT

Aspects of the present disclosure involve a vehicle computer system comprising a computer-readable storage medium storing a set of instructions, and a method for online light detection and ranging (Lidar) intensity normalization. Consistent with some embodiments, the method may include accumulating point data output by a channel of a Lidar unit during operation of an autonomous or semi-autonomous vehicle. The accumulated point data includes raw intensity values that correspond to a particular surface type. The method further includes calculating a median intensity value based on the raw intensity values and generating an intensity normalization multiplier for the channel based on the median intensity value. The intensity normalization multiplier, when applied to the median intensity value, results in a reflectivity value that corresponds to the particular surface type. The method further includes applying the intensity normalization multiplier to the point data output by the channel to produce normalized intensity values.

20 Claims, 4 Drawing Sheets

100 ⟍

Related U.S. Application Data

(60) Provisional application No. 62/614,891, filed on Jan. 8, 2018.

(51) Int. Cl.

| | |
|---|---|
| *G01S 7/497* | (2006.01) |
| *G01S 17/06* | (2006.01) |
| *G01S 17/89* | (2020.01) |
| *G01S 17/931* | (2020.01) |

(56) References Cited

U.S. PATENT DOCUMENTS

2018/0141544 A1\*  5/2018  Xiao .................. G01C 21/3469
2018/0348374 A1  12/2018  Laddha et al.

OTHER PUBLICATIONS

Hata, Alberto, and Denis Wolf. "Road marking detection using LIDAR reflective intensity data and its application to vehicle localization." 17th International IEEE Conference on Intelligent Transportation Systems (ITSC). IEEE, 2014. (Year: 2014).\*
FQin, Yuchu, et al. "Characterizing radiometric attributes of point cloud using a normalized reflective factor derived from small footprint LiDAR waveform." IEEE Journal of Selected Topics in Applied Earth Observations and Remote Sensing 8.2 (2014): 740-749. (Year: 2014).\*

\* cited by examiner

300

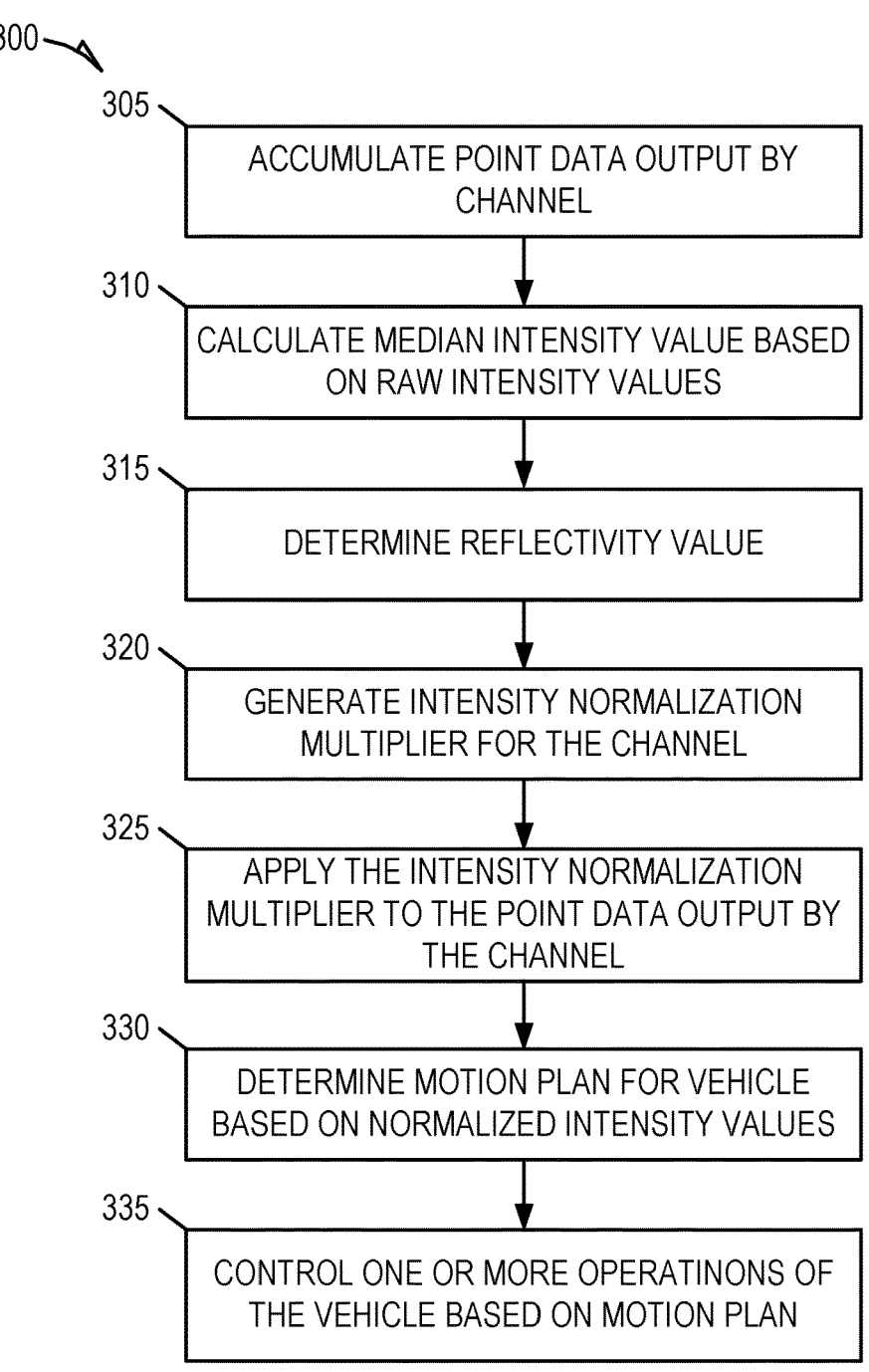

305  ACCUMULATE POINT DATA OUTPUT BY CHANNEL

310  CALCULATE MEDIAN INTENSITY VALUE BASED ON RAW INTENSITY VALUES

315  DETERMINE REFLECTIVITY VALUE

320  GENERATE INTENSITY NORMALIZATION MULTIPLIER FOR THE CHANNEL

325  APPLY THE INTENSITY NORMALIZATION MULTIPLIER TO THE POINT DATA OUTPUT BY THE CHANNEL

330  DETERMINE MOTION PLAN FOR VEHICLE BASED ON NORMALIZED INTENSITY VALUES

335  CONTROL ONE OR MORE OPERATINONS OF THE VEHICLE BASED ON MOTION PLAN

*FIG. 3*

ONLINE LIDAR INTENSITY NORMALIZATION

PRIORITY CLAIM

The present application is a continuation of U.S. application Ser. No. 16/220,336 having a filing date of Dec. 14, 2018, which claims the benefit of U.S. Provisional Application No. 62/614,891 filed Jan. 8, 2018. Applicant claims priority to and the benefit of each of such applications and incorporates all such applications herein by reference in its entirety.

TECHNICAL FIELD

The subject matter disclosed herein relates to light detection and ranging (Lidar) units. In particular, example embodiments may relate to systems and methods for normalizing Lidar intensity values during operation.

BACKGROUND

Lidar is a radar-like system that uses lasers to create three-dimensional representations of surrounding environments. A Lidar unit includes at least one laser emitter paired with a detector to form a channel, though an array of channels may be used to expand the field of view of the Lidar unit. During operation, each channel emits a laser signal into the environment that is reflected off of the surrounding environment back to the detector. A single channel provides a single point of ranging information. Collectively, channels are combined to create a point cloud that corresponds to a three-dimensional representation of the surrounding environment. The Lidar unit also includes circuitry to measure the time of flight—i.e., the elapsed time from emitting the laser signal to detecting the return signal. The time of flight is used to determine the distance of the Lidar unit to the detected object. Some Lidar units also measure the intensity of the return signal. The intensity of the return signal provides information about the surface reflecting the signal and can be used for object detection. The intensity of the return signals depends on a number of factors, such as the distance of the Lidar to the detected object, the angle of incidence of the emitted laser signal, temperature of the surrounding environment, and the reflectivity of the detected object. Other factors such as the alignment of the emitter and detector pairs adds signal noise that may impact the uniformity of intensity values output by each channel.

Increasingly, Lidar is finding applications in autonomous vehicles such as partially or fully autonomous cars. Lidar systems for vehicles typically include an array of lasers ("emitters") and an array of detectors, as discussed above. Autonomous vehicles use Lidar for a number of functions, including localization, perception, prediction, and motion planning. Frequently, the intensity values returned by each Lidar channel are used in the localization, perception, prediction, and motion planning of autonomous vehicles because these signals provide information related to the reflectiveness of detected objects.

BRIEF DESCRIPTION OF THE DRAWINGS

Various ones of the appended drawings merely illustrate example embodiments of the present inventive subject matter and cannot be considered as limiting its scope.

FIG. 3 is a flowchart illustrating a method for normalizing Lidar intensity values during operation, according to some embodiments.

DETAILED DESCRIPTION

Figure 1:
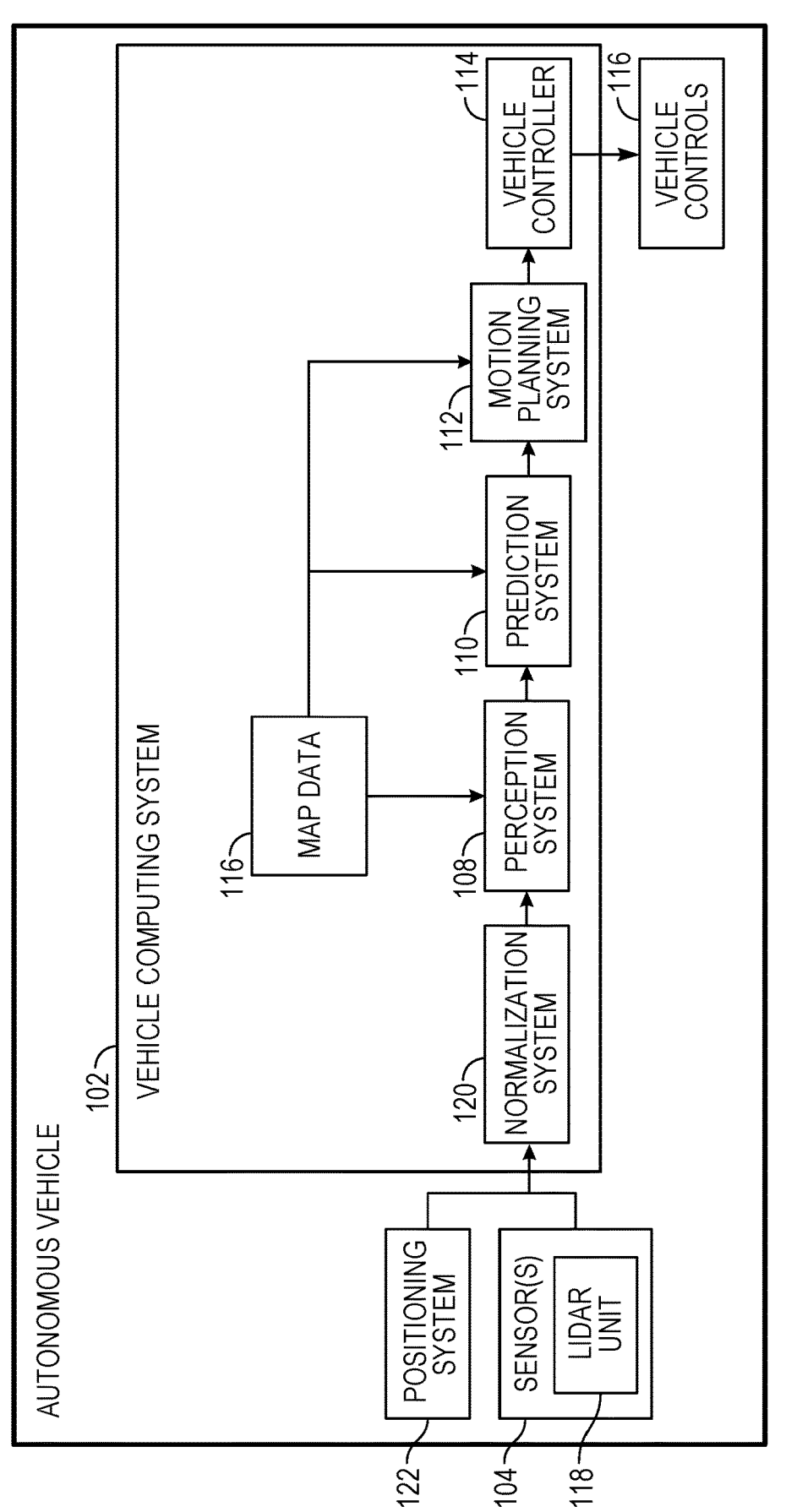
FIG. 1 is a block diagram illustrating an example autonomous vehicle, according to some embodiments.

Reference will now be made in detail to specific example embodiments for carrying out the inventive subject matter. Examples of these specific embodiments are illustrated in the accompanying drawings, and specific details are set forth in the following description in order to provide a thorough understanding of the subject matter. It will be understood that these examples are not intended to limit the scope of the claims to the illustrated embodiments. On the contrary, they are intended to cover such alternatives, modifications, and equivalents as may be included within the scope of the disclosure.

Given the lack of uniformity of Lidar intensity values caused by signal noise and the other factors that impact intensity of return signals described above, use of the raw intensity values provided by the Lidar unit often leads to inaccuracies and other problems with localization, perception, prediction, and motion planning for autonomous and semi-autonomous vehicles. To address these issues, among others, aspects of the present disclosure involve systems, methods, and devices for normalizing Lidar intensity values during operation. In accordance with some embodiments, a method includes obtaining point data output by each channel of an operating Lidar unit. The point data includes multiple data points, each of which has an associated raw intensity value. Within the point data, a set of data points that each correspond to a particular surface type are identified and collected. For example, data points that correspond to an asphalt road surface may be identified and collected. Data points corresponding to the type of surface may be identified through association with historic data points known to correspond to the type of surface. A reference map that includes the historic data points may be utilized in the identification of the data points that correspond to the type of surface.

To account for differences in intensity returns of each channel of a Lidar unit, intensity values output by each channel are independently processed. Accordingly, the method includes determining an intensity normalization multiplier for each channel of the Lidar unit. The intensity normalization multiplier for a channel is determined based on a median intensity value determined based on the raw intensity values included in the collected set of data points that correspond to the channel. The determination of the intensity normalization multipliers assumes a predefined value for reflectivity of the type of surface (e.g., a ground truth reflectivity) to which the data points correspond. The predefined value for the reflectivity of the surface type may be based on a reference map or reference look-up table that includes expected values for reflectivity of surfaces based on historical or directly measured values. The intensity normalization multiplier is determined such that when the intensity normalization multiplier is applied to the median intensity value for the channel, the result is the predefined value for the reflectivity of the surface type.

The method further includes applying the intensity normalization multiplier determined for each channel to the point data output by the channel during operation of the Lidar unit. The applying of the intensity normalization multipliers to the point data output results in an output of normalized intensity values, which may be used in downstream processing for localization, perception, prediction, and motion planning of an autonomous vehicle in motion. The intensity normalization multiplier generated for each channel is applied to the output of the channel until the intensity normalization multiplier is recalculated, which is periodically performed at a predefined time interval (e.g., five seconds) to account for changes in temperature in the surrounding environment.

By normalizing raw intensity values in the manner, the method aligns Lidar intensity returns more closely with the reflectivity of reflected surfaces and objects thereby providing downstream processing systems with more accurate and detailed information regarding the reflected surfaces and objects. The downstream processing system may use the more accurate and detailed information to improve autonomous or semi-autonomous vehicle localization, perception, prediction, and motion planning. Further, by independently normalizing each channel of the Lidar unit, the method accounts for differences in each channel (e.g., alignment of emitters and receivers) that lead to variances in intensity returns among channels.

With reference to FIG. 1, an example autonomous vehicle 100 is illustrated, according to some embodiments. To avoid obscuring the inventive subject matter with unnecessary detail, various functional components that are not germane to conveying an understanding of the inventive subject matter have been omitted from FIG. 1. However, a skilled artisan will readily recognize that various additional functional components may be included as part of the autonomous vehicle 100 to facilitate additional functionality that is not specifically described herein.

The autonomous vehicle 100 is capable of sensing its environment and navigating without human input. The autonomous vehicle 100 can be a ground-based autonomous vehicle (e.g., car, truck, bus, etc.), an air-based autonomous vehicle (e.g., airplane, drone, helicopter, or other aircraft), or other types of vehicles (e.g., watercraft).

The autonomous vehicle 100 includes a vehicle computing system 102, one or more sensors 104, and one or more vehicle controls 106. The vehicle computing system 102 can assist in controlling the autonomous vehicle 100. In particular, the vehicle computing system 102 can receive sensor data from the one or more sensors 104, attempt to comprehend the surrounding environment by performing various processing techniques on data collected by the sensors 104, and generate an appropriate motion path through such surrounding environment. The vehicle computing system 102 can control the one or more vehicle controls 106 to operate the autonomous vehicle 100 according to the motion path.

As illustrated in FIG. 1, the vehicle computing system 102 can include one or more computing devices that assist in controlling the autonomous vehicle 100. Vehicle computing system 102 can include a perception system 108, a prediction system 110, and a motion planning system 112 that cooperate to perceive the dynamic surrounding environment of the autonomous vehicle 100 and determine a trajectory describing a proposed motion path for the autonomous vehicle 100. Vehicle computing system 102 can additionally include a vehicle controller 114 configured to control the one or more vehicle controls 106 (e.g., actuators that control gas flow (propulsion), steering, braking, etc.) to execute the motion of the autonomous vehicle 100 to follow the trajectory.

In particular, in some implementations, any one of the perception system 108, the prediction system 110, and the motion planning system 112 can receive sensor data from the one or more sensors 104 that are coupled to or otherwise included within the autonomous vehicle 100. As examples, the one or more sensors 104 can include a Lidar unit 118, a Radio Detection and Ranging (RADAR) system, one or more cameras (e.g., visible spectrum cameras, infrared cameras, etc.), and/or other sensors. The sensor data can include information that describes the location of objects within the surrounding environment of the autonomous vehicle 100.

As one example, for Lidar unit 118, the sensor data can include point data that includes the location (e.g., in three-dimensional space relative to the LIDAR unit 118) of a number of points that correspond to objects that have reflected an emitted laser. For example, Lidar unit 118 can measure distances by measuring the Time of Flight (TOF) that it takes a short laser pulse to travel from the sensor(s) 104 to an object and back, calculating the distance from the known speed of light. The point data further includes an intensity value for each point, which, as described above, can provide information about the reflectiveness of the objects that have reflected an emitted laser. As will be described in further detail below, the vehicle computing system 102 may normalize the intensity value returns during vehicle operation thereby aligning the intensity value returns more closely with the actual reflectivity of the surfaces and objects that have reflected an emitted laser.

The vehicle computing system 102 may also include a normalization system 120 configured to normalize the intensity value returns from the Lidar unit 118 prior to downstream processing by the perception system 108, the prediction system 110, and the motion planning system 112. As will be described in further detail below, the normalization system 120 normalizes intensity values in a manner that aligns them more closely with the actual reflectivity of the surfaces and objects that have reflected an emitted laser.

As another example, for RADAR systems, the sensor data can include the location (e.g., in three-dimensional space relative to the RADAR system) of a number of points that correspond to objects that have reflected a ranging radio wave. For example, radio waves (e.g., pulsed or continuous) transmitted by the RADAR system can reflect off an object and return to a receiver of the RADAR system, giving information about the object's location and speed. Thus, a RADAR system can provide useful information about the current speed of an object.

As yet another example, for cameras, various processing techniques (e.g., range imaging techniques such as, for example, structure from motion, structured light, stereo triangulation, and/or other techniques) can be performed to identify the location (e.g., in three-dimensional space relative to a camera) of a number of points that correspond to objects that are depicted in imagery captured by the camera. Other sensor systems can identify the location of points that correspond to objects as well.

As another example, the one or more sensors 104 can include a positioning system 122. The positioning system 122 can determine a current position of the autonomous vehicle 100. The positioning system 122 can be any device or circuitry for analyzing the position of the autonomous vehicle 100. For example, the positioning system 122 can determine position by using one or more of inertial sensors, a satellite positioning system, based on IP address, by using triangulation and/or proximity to network access points or other network components (e.g., cellular towers, WiFi access points, etc.) and/or other suitable techniques. The position of the autonomous vehicle 100 can be used by various systems of the vehicle computing system 102.

Thus, the one or more sensors 104 can be used to collect sensor data that includes information that describes the location (e.g., in three-dimensional space relative to the autonomous vehicle 100) of points that correspond to objects within the surrounding environment of the autonomous vehicle 100.

In addition to the sensor data, the perception system 108, prediction system 110 and/or motion planning system 112 can retrieve or otherwise obtain map data 116 that provides detailed information about the surrounding environment of the autonomous vehicle 100. The map data 116 can provide information regarding: the identity and location of different travelways (e.g., roadways, alleyways, trails, and other paths designated for travel), road segments, buildings, or other items or objects (e.g., lampposts, crosswalks, curbing, etc.); known reflectiveness (e.g., radiance) of different travelways (e.g., roadways), road segments, buildings, or other items or objects (e.g., lampposts, crosswalks, curbing, etc.); the location and directions of traffic lanes (e.g., the location and direction of a parking lane, a turning lane, a bicycle lane, or other lanes within a particular roadway or other travelway); traffic control data (e.g., the location and instructions of signage, traffic lights, or other traffic control devices); and/or any other map data that provides information that assists the vehicle computing system 102 in comprehending and perceiving its surrounding environment and its relationship thereto.

In addition, according to an aspect of the present disclosure, the map data 116 can include information that describes a significant number of nominal pathways through the world. As an example, in some instances, nominal pathways can generally correspond to common patterns of vehicle travel along one or more lanes (e.g., lanes on a roadway or other travelway). For example, a nominal pathway through a lane can generally correspond to a center line of such lane.

The perception system 108 can identify one or more objects that are proximate to the autonomous vehicle 100 based on sensor data received from the one or more sensors 104 and/or the map data 116. In particular, in some implementations, the perception system 108 can determine, for each object, state data that describes a current state of such object. As examples, the state data for each object can describe an estimate of the object's: current location (also referred to as position); current speed (also referred to as velocity); current acceleration; current heading; current orientation; size/footprint (e.g., as represented by a bounding shape such as a bounding polygon or polyhedron); class (e.g., vehicle versus pedestrian versus bicycle versus other); yaw rate; and/or other state information.

In some implementations, the perception system 108 can determine state data for each object over a number of iterations. In particular, the perception system 108 can update the state data for each object at each iteration. Thus, the perception system 108 can detect and track objects (e.g., vehicles) that are proximate to the autonomous vehicle 100 over time.

The prediction system 110 can receive the state data from the perception system 108 and predict one or more future locations for each object based on such state data. For example, the prediction system 110 can predict where each object will be located within the next 5 seconds, 10 seconds, 20 seconds, etc. As one example, an object can be predicted to adhere to its current trajectory according to its current speed. As another example, other, more sophisticated prediction techniques or modeling can be used.

The motion planning system 112 can determine a motion plan for the autonomous vehicle 100 based at least in part on the predicted one or more future locations for the object provided by the prediction system 110 and/or the state data for the object provided by the perception system 108. Stated differently, given information about the current locations of objects and/or predicted future locations of proximate objects, the motion planning system 112 can determine a motion plan for the autonomous vehicle 100 that best navigates the autonomous vehicle 100 relative to the objects at such locations.

The motion plan can be provided from the motion planning system 112 to a vehicle controller 114. In some implementations, the vehicle controller 114 can be a linear controller that may not have the same level of information about the environment and obstacles around the desired path of movement as is available in other computing system components (e.g., the perception system 108, prediction system 110, motion planning system 112, etc.) Nonetheless, the vehicle controller 114 can function to keep the autonomous vehicle 100 reasonably close to the motion plan.

More particularly, the vehicle controller 114 can be configured to control motion of the autonomous vehicle 100 to follow the motion plan. The vehicle controller 114 can control one or more of propulsion and braking of the autonomous vehicle 100 to follow the motion plan. The vehicle controller 114 can also control steering of the autonomous vehicle 100 to follow the motion plan. In some implementations, the vehicle controller 114 can be configured to generate one or more vehicle actuator commands and to further control one or more vehicle actuators provided within vehicle controls 106 in accordance with the vehicle actuator command(s). Vehicle actuators within vehicle controls 106 can include, for example, a steering actuator, a braking actuator, and/or a propulsion actuator.

Each of the perception system 108, the prediction system 110, the motion planning system 112, and the vehicle controller 114 can include computer logic utilized to provide desired functionality. In some implementations, each of the perception system 108, the prediction system 110, the motion planning system 112, and the vehicle controller 114 can be implemented in hardware, firmware, and/or software controlling a general-purpose processor. For example, in some implementations, each of the perception system 108, the prediction system 110, the motion planning system 112, and the vehicle controller 114 includes program files stored on a storage device, loaded into a memory and executed by one or more processors. In other implementations, each of the perception system 108, the prediction system 110, the motion planning system 112, and the vehicle controller 114 includes one or more sets of computer-executable instructions that are stored in a tangible computer-readable storage medium such as RAM, hard disk, or optical or magnetic media.

Figure 2:
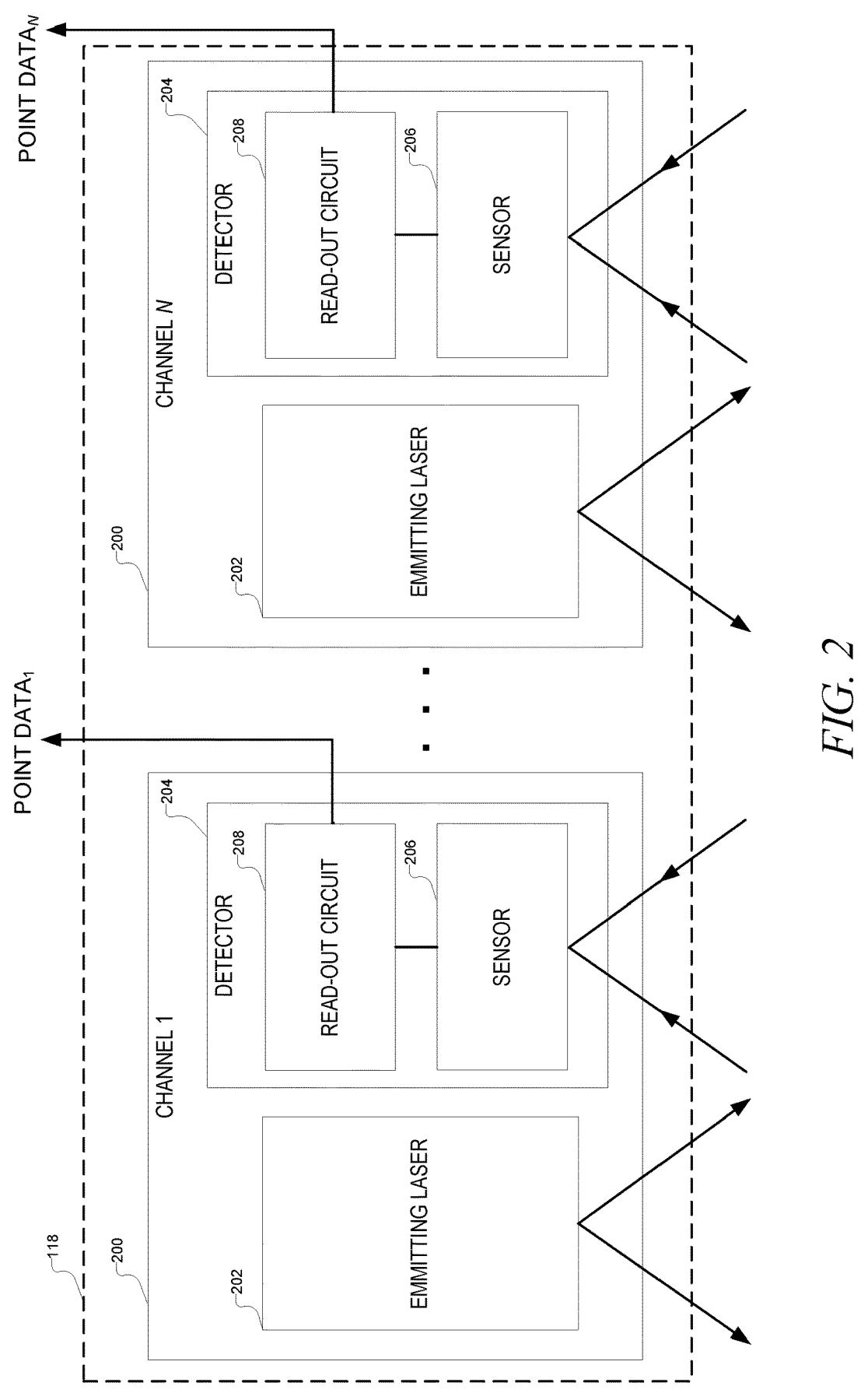
FIG. 2 is block diagram illustrating a Lidar unit, which may be included as part of the autonomous vehicle illustrated in FIG. 1, according to some embodiments.

FIG. 2 is block diagram illustrating the LIDAR unit 118, which may be included as part of the autonomous vehicle 100, according to some embodiments. To avoid obscuring the inventive subject matter with unnecessary detail, various functional components that are not germane to conveying an understanding of the inventive subject matter have been omitted from FIG. 2. However, a skilled artisan will readily recognize that various additional functional components may be included as part of the LIDAR unit 118 to facilitate additional functionality that is not specifically described herein.

As shown, the LIDAR unit 118 comprises multiple channels 200—specifically, channels 1-N are illustrated. Each channel 200 outputs point data that provides a single point of ranging information. Collectively, the point data output by each of the channels 200 (i.e., point data$_{1-N}$) is combined to create a point cloud that corresponds to a three-dimensional representation of the surrounding environment.

Each channel 200 comprises an emitter 202 paired with a detector 204. The emitter 202 emits a laser signal into the environment that is reflected off the surrounding environment and returned back to a sensor 206 (e.g., a photodetector) in the detector 204. The sensor 206 provides the return signal to a read-out circuit 208 and the read-out circuit 208, in turn, outputs the point data based on the return signal. The point data comprises a distance of the LIDAR unit 118 from a detected surface (e.g., a road) that is determined by the read-out circuit 208 by measuring the time of flight, which is the time elapsed time between the emitter 202 emitting the laser signal and the detector 204 detecting the return signal.

The point data further includes an intensity value corresponding to each return signal. The intensity value indicates a measure of intensity of the return signal determined by the read-out circuit 208. As noted above, the intensity of the return signal provides information about the surface reflecting the signal and can be used by any one of the perception system 108, prediction system 110, and motion planning system 112 for localization, perception, prediction, and motion planning. The intensity of the return signals depends on a number of factors, such as the distance of the LIDAR unit 118 to the detected surface, the angle of incidence at which the emitter 202 emits the laser signal, temperature of the surrounding environment, the alignment of the emitter 202 and the detector 204, and the reflectivity of the detected surface.

FIG. 3 is a flowchart illustrating a method 300 for normalizing Lidar intensity values during operation, according to some embodiments. The method 300 may be embodied in computer-readable instructions for execution by a hardware component (e.g., a processor) such that the operations of the method 300 may be performed by the vehicle computing system 102. Accordingly, the method 300 is described below, by way of example with reference thereto. However, it shall be appreciated that the method 300 may be deployed on various other hardware configurations and is not intended to be limited to deployment on the vehicle computing system 102. For example, in some embodiments, the LIDAR unit 118 may include one or more hardware components configured (e.g., by a set of computer-readable instructions) to execute the operations of the method 300.

At operation 305, the normalization system 120 accumulates point data output by a channel 200 from among the plurality of channels 200 during operation of the autonomous vehicle 100. The normalization system 120 may accumulate point data output by the channel 200 over a predefined time interval. During the predefined time interval, the autonomous vehicle 100 is operating, though it may be in motion, stationary, or a combination of both. The point data output by the channel includes a set of points, each of which has an associated raw intensity value. Thus, the accumulated point data includes a plurality of raw intensity values. Further, each point in the set of points corresponds to a particular surface type, such as a road surface, or even more specifically an asphalt road surface. In other words, each point in the set of points results from reflectance of the laser signal emitted by the emitter 202 off of a surface that is of a particular type (e.g., a road surface). Hence, the set of points included in the point data accumulated at operation 305 represents only a subset of the total point data output by the channel 200 during operation of the LIDAR unit 118. More specifically, the set includes only those points that correspond to the surface type, and excludes other points that correspond to other surface types.

Accordingly, the accumulating of the point data includes obtaining a plurality of data points output by the channel 200 (e.g., over the predefined time interval) and identifying a subset of the plurality of data points that correspond to the particular type of surface based on reference map data (e.g., map data 116). The subset of data points may be identified, for example through association with historic data points represented in the reference map data known to correspond to the surface type (e.g., data points known to correspond to an asphalt road surface).

At operation 310, the normalization system 120 calculates a median intensity value based on the raw intensity values included in the accumulated point data output by the channel 200. At operation 315, the normalization system 120 determines a reflectivity value expected for the type of surface to which the raw intensity values correspond. The reflectivity value may, for example, be a ground truth reflectivity value for the type of surface that includes a known measure of the reflective characteristics of the surface type. The determination of the reflectivity value for the surface type may be based on reference map data (e.g., map data 116) that includes historic or expected reflectivity values or a reference look-up table comprising known reflectivity values for multiple different surface types.

At operation 320, the normalization system 120 generates an intensity normalization multiplier for the channel 200 based on the median intensity value and the reflectivity value. More specifically, the normalization system 120 determines the intensity normalization multiplier such that when the intensity normalization multiplier is applied to the median intensity value, the result is the reflectivity value expected for the surface type. Accordingly, the normalization system 120 may determine the intensity normalization multiplier by dividing the reflectivity value by the median intensity value.

At operation 325, the normalization system 120 applies the intensity normalization multiplier to subsequent point data output by the channel 200. The normalization system 120 applies the intensity normalization multiplier to the point data by multiplying each raw intensity value included in the point data output by the intensity normalization multiplier. The result of multiplying a raw intensity value by the intensity normalization multiplier is a normalized intensity value. By normalizing these values in the manner, the resulting intensity values are more closely aligned with the reflectivity of reflected surfaces and objects thereby providing downstream processing systems (e.g., the perception system 108, the prediction system 110, the motion planning system 112, and the vehicle controller 114) with more accurate and detailed information regarding the reflected surfaces and objects. These systems may use the more accurate and detailed information to improve autonomous or semi-autonomous vehicle localization, perception, prediction, and motion planning.

At operation 330, the motion planning system 112 determines a motion plan for the autonomous vehicle 100 based on normalized intensity values. At operation 335, the vehicle controller 114 uses the motion plan to control one or more operations of the autonomous vehicle 100.

To account for temperature impacts to intensity value returns, the normalization system 120 may repeat the method 300 at predefined intervals (e.g., 5 seconds) such as the predefined time interval referenced above with respect to operation 305. In this way, the normalization system 120 applies a determined intensity normalization multiplier to the output of the corresponding channel 200 during the interval until a new intensity normalization multiplier is determined, at which point the normalization system 120 applies the new intensity normalization multiplier to the point data output by the channel 200.

Although the method 300 is described above in reference to a single channel 200, it shall be appreciated that each operations 305, 310, 315, 320, and 325 of the method 300 may be repeated for each of the channels 200 included in the LIDAR unit 118 to account for differences in factors that impact raw intensity values returned by each channel 200 (e.g., differences in alignments of emitters 202 and detectors 204 in each channel 200). Put differently, for each of the channels 1-N, the normalization system 120 accumulates point data that corresponds to a particular type of surface (operation 305), determines a median intensity value (operation 310), determines a reflectivity value for the particular type of surface (operation 315), determines an intensity normalization multiplier (operation 320), and applies the intensity normalization multiplier to the point data output by the channel 200 to produce normalized intensity values (operation 325). In this way, the normalization system 120 independently normalizes intensity returns of each channel 200 of the LIDAR unit 118 by independently determining and applying an intensity normalization multiplier for each channel.

Figure 4:
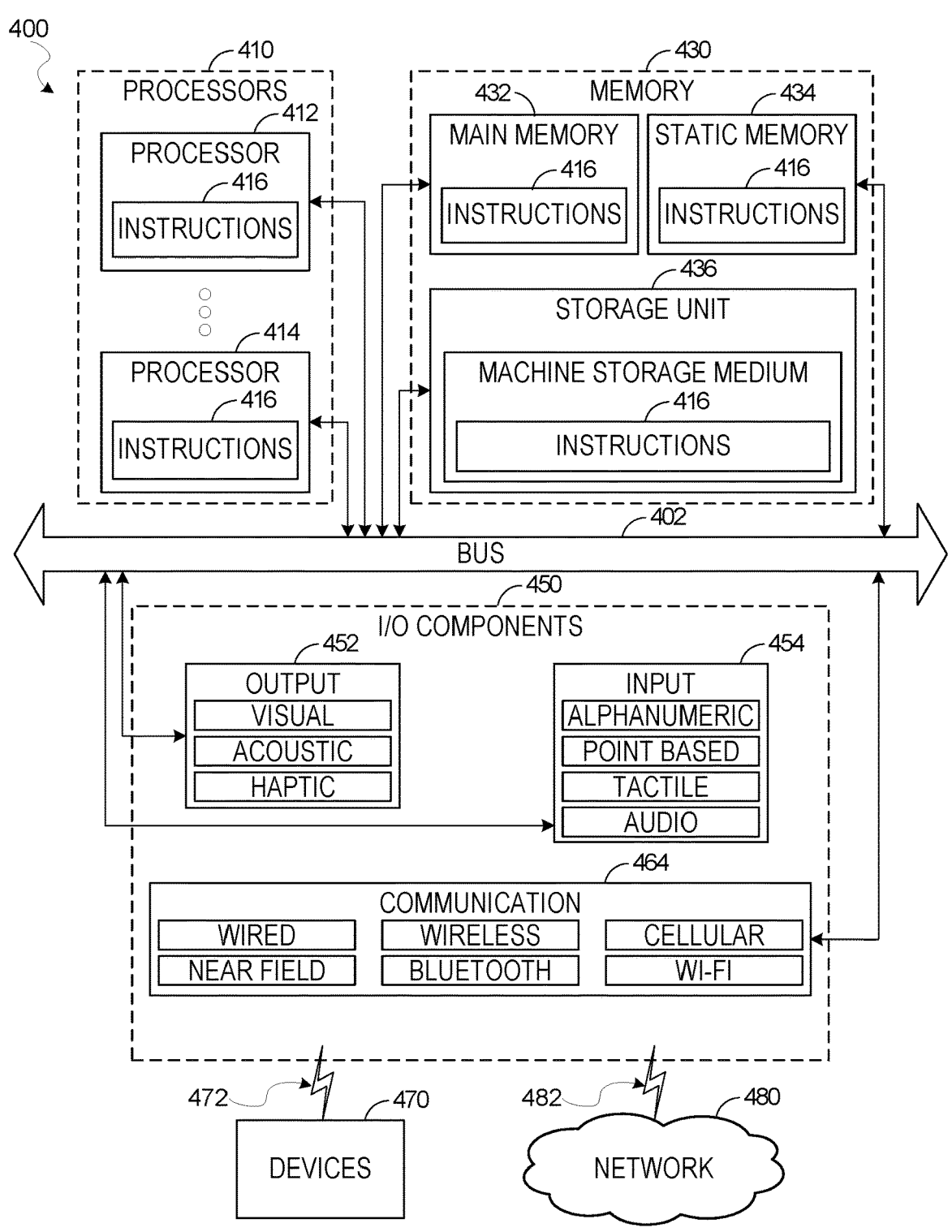
FIG. 4 is a diagrammatic representation of a machine in the example form of a computer system within which a set of instructions for causing the machine to perform any one or more of the methodologies discussed herein may be executed.

FIG. 4 illustrates a diagrammatic representation of a machine 400 in the form of a computer system within which a set of instructions may be executed for causing the machine 400 to perform any one or more of the methodologies discussed herein, according to an example embodiment. Specifically, FIG. 4 shows a diagrammatic representation of the machine 400 in the example form of a computer system, within which instructions 416 (e.g., software, a program, an application, an applet, an app, or other executable code) for causing the machine 400 to perform any one or more of the methodologies discussed herein may be executed. For example, the instructions 416 may cause the machine 400 to execute the method 300. In this way, the instructions 416 transform a general, non-programmed machine into a particular machine 400, such as the vehicle computing system 102, that is specially configured to carry out the described and illustrated functions in the manner described here. In alternative embodiments, the machine 400 operates as a standalone device or may be coupled (e.g., networked) to other machines. In a networked deployment, the machine 400 may operate in the capacity of a server machine or a client machine in a server-client network environment, or as a peer machine in a peer-to-peer (or distributed) network environment. The machine 400 may comprise, but not be limited to, a server computer, a client computer, a personal computer (PC), a tablet computer, a laptop computer, a netbook, a smart phone, a mobile device, a network router, a network switch, a network bridge, or any machine capable of executing the instructions 416, sequentially or otherwise, that specify actions to be taken by the machine 400. Further, while only a single machine 400 is illustrated, the term "machine" shall also be taken to include a collection of machines 400 that individually or jointly execute the instructions 416 to perform any one or more of the methodologies discussed herein.

The machine 400 may include processors 410, memory 430, and I/O components 450, which may be configured to communicate with each other such as via a bus 502. In an example embodiment, the processors 410 (e.g., a central processing unit (CPU), a reduced instruction set computing (RISC) processor, a complex instruction set computing (CISC) processor, a graphics processing unit (GPU), a digital signal processor (DSP), an application-specific integrated circuit (ASIC), a radio-frequency integrated circuit (RFIC), another processor, or any suitable combination thereof) may include, for example, a processor 412 and a processor 414 that may execute the instructions 416. The term "processor" is intended to include multi-core processors 410 that may comprise two or more independent processors (sometimes referred to as "cores") that may execute instructions contemporaneously. Although FIG. 4 shows multiple processors 410, the machine 400 may include a single processor with a single core, a single processor with multiple cores (e.g., a multi-core processor), multiple processors with a single core, multiple processors with multiple cores, or any combination thereof.

The memory 430 may include a main memory 432, a static memory 434, and a storage unit 436, both accessible to the processors 410 such as via the bus 402. The main memory 432, the static memory 434, and the storage unit 436 store the instructions 416 embodying any one or more of the methodologies or functions described herein. The instructions 416 may also reside, completely or partially, within the main memory 432, within the static memory 434, within the storage unit 436, within at least one of the processors 410 (e.g., within the processor's cache memory), or any suitable combination thereof, during execution thereof by the machine 400.

The I/O components 450 may include a wide variety of components to receive input, provide output, produce output, transmit information, exchange information, capture measurements, and so on. The specific I/O components 450 that are included in a particular machine 400 will depend on the type of machine. For example, portable machines such as mobile phones will likely include a touch input device or other such input mechanisms, while a headless server machine will likely not include such a touch input device. It will be appreciated that the I/O components 450 may include many other components that are not shown in FIG. 4. The I/O components 450 are grouped according to functionality merely for simplifying the following discussion and the grouping is in no way limiting. In various example embodiments, the I/O components 450 may include output components 452 and input components 454. The output components 452 may include visual components (e.g., a display such as a plasma display panel (PDP), a light emitting diode (LED) display, a liquid crystal display (LCD), a projector, or a cathode ray tube (CRT)), acoustic components (e.g., speakers), other signal generators, and so forth. The input components 454 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and/or force of touches or touch gestures, or other tactile input components), audio input components (e.g., a microphone), and the like.

Communication may be implemented using a wide variety of technologies. The I/O components 450 may include communication components 464 operable to couple the machine 400 to a network 480 or devices 470 via a coupling 482 and a coupling 472, respectively. For example, the communication components 464 may include a network interface component or another suitable device to interface with the network 480. In further examples, the communication components 464 may include wired communication components, wireless communication components, cellular communication components, and other communication components to provide communication via other modalities. The devices 470 may be another machine or any of a wide variety of peripheral devices (e.g., a peripheral device coupled via a universal serial bus (USB)).

Executable Instructions and Machine Storage Medium

The various memories (e.g., 430, 432, 434, and/or memory of the processor(s) 410) and/or the storage unit 436 may store one or more sets of instructions 416 and data structures (e.g., software) embodying or utilized by any one or more of the methodologies or functions described herein. These instructions, when executed by the processor(s) 410, cause various operations to implement the disclosed embodiments.

As used herein, the terms "machine-storage medium," "device-storage medium," and "computer-storage medium" mean the same thing and may be used interchangeably in this disclosure. The terms refer to a single or multiple storage devices and/or media (e.g., a centralized or distributed database, and/or associated caches and servers) that store executable instructions and/or data. The terms shall accordingly be taken to include, but not be limited to, solid-state memories, and optical and magnetic media, including memory internal or external to processors. Specific examples of machine-storage media, computer-storage media, and/or device-storage media include non-volatile memory, including by way of example semiconductor memory devices, e.g., erasable programmable read-only memory (EPROM), electrically erasable programmable read-only memory (EEPROM), field-programmable gate arrays (FPGAs), and flash memory devices; magnetic disks such as internal hard disks and removable disks; magneto-optical disks; and CD-ROM and DVD-ROM disks. The terms "machine-storage media," "computer-storage media," and "device-storage media" specifically exclude carrier waves, modulated data signals, and other such media, at least some of which are covered under the term "signal medium" discussed below.

Transmission Medium

In various example embodiments, one or more portions of the network 480 may be an ad hoc network, an intranet, an extranet, a virtual private network (VPN), a local-area network (LAN), a wireless LAN (WLAN), a wide-area network (WAN), a wireless WAN (WWAN), a metropolitan-area network (MAN), the Internet, a portion of the Internet, a portion of the public switched telephone network (PSTN), a plain old telephone service (POTS) network, a cellular telephone network, a wireless network, a Wi-Fi® network, another type of network, or a combination of two or more such networks. For example, the network 480 or a portion of the network 480 may include a wireless or cellular network, and the coupling 482 may be a Code Division Multiple Access (CDMA) connection, a Global System for Mobile communications (GSM) connection, or another type of cellular or wireless coupling. In this example, the coupling 482 may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High-Speed Packet Access (HSPA), Worldwide Interoperability for Microwave Access (WiMAX), Long Term Evolution (LTE) standard, others defined by various standard-setting organizations, other long-range protocols, or other data transfer technology.

The instructions 416 may be transmitted or received over the network 480 using a transmission medium via a network interface device (e.g., a network interface component included in the communication components 464) and utilizing any one of a number of well-known transfer protocols (e.g., hypertext transfer protocol (HTTP)). Similarly, the instructions 416 may be transmitted or received using a transmission medium via the coupling 472 (e.g., a peer-to-peer coupling) to the devices 470. The terms "transmission medium" and "signal medium" mean the same thing and may be used interchangeably in this disclosure. The terms "transmission medium" and "signal medium" shall be taken to include any intangible medium that is capable of storing, encoding, or carrying the instructions 416 for execution by the machine 400, and include digital or analog communications signals or other intangible media to facilitate communication of such software. Hence, the terms "transmission medium" and "signal medium" shall be taken to include any form of modulated data signal, carrier wave, and so forth. The term "modulated data signal" means a signal that has one or more of its characteristics set or changed in such a manner as to encode information in the signal.

Computer-Readable Medium

The terms "machine-readable medium," "computer-readable medium," and "device-readable medium" mean the same thing and may be used interchangeably in this disclosure. The terms are defined to include both machine-storage media and transmission media. Thus, the terms include both storage devices/media and carrier waves/modulated data signals.

The various operations of example methods described herein may be performed, at least partially, by one or more processors that are temporarily configured (e.g., by software) or permanently configured to perform the relevant operations. Similarly, the methods described herein may be at least partially processor-implemented. For example, at least some of the operations of a method may be performed by one or more processors. The performance of certain of the operations may be distributed among the one or more processors, not only residing within a single machine, but deployed across a number of machines. In some example embodiments, the processor or processors may be located in a single location (e.g., within a home environment, an office environment, or a server farm), while in other embodiments the processors may be distributed across a number of locations.

Although the embodiments of the present disclosure have been described with reference to specific example embodiments, it will be evident that various modifications and changes may be made to these embodiments without departing from the broader scope of the inventive subject matter. Accordingly, the specification and drawings are to be regarded in an illustrative rather than a restrictive sense. The accompanying drawings that form a part hereof show, by way of illustration, and not of limitation, specific embodiments in which the subject matter may be practiced. The embodiments illustrated are described in sufficient detail to enable those skilled in the art to practice the teachings disclosed herein. Other embodiments may be used and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent, to those of skill in the art, upon reviewing the above description.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended; that is, a system, device, article, or process that includes elements in addition to those listed after such a term in a claim is still deemed to fall within the scope of that claim.

What is claimed is:

1. A vehicle computing system comprising:
one or more processors; and
a non-transitory computer-readable medium storing instructions that are executable by the one or more processors to cause the vehicle computing system to perform operations comprising:
obtaining point data output by a first channel from among a plurality of channels associated with a sensor device of a vehicle, the point data comprising a plurality of raw intensity values that correspond to a particular surface type;
calculating a particular intensity value based on the plurality of raw intensity values;
generating an intensity normalization multiplier for the first channel based on the particular intensity value;
based on the intensity normalization multiplier, determining a normalized intensity value for subsequent point data output by the first channel;
recalculating the intensity normalization multiplier for the first channel at a subsequent time interval to account for a change in a temperature of an environment of the sensor device;
determining a motion path for the vehicle based on the normalized intensity value; and
controlling operations of the vehicle based on the motion path.

2. The vehicle computing system of claim 1, wherein application of the intensity normalization multiplier to the particular intensity value results in a reflectivity value that corresponds to the particular surface type.

3. The vehicle computing system of claim 1, wherein the operations further comprise:
obtaining additional point data output by a second channel from among the plurality of channels of the sensor device;
generating an additional intensity normalization multiplier for the second channel; and
applying the additional intensity normalization multiplier to the additional point data output by the second channel.

4. The vehicle computing system of claim 1, wherein the operations further comprise:
updating the intensity normalization multiplier based on the subsequent point data output by the first channel; and
applying the updated intensity normalization multiplier to further point data output by the first channel.

5. The vehicle computing system of claim 1, wherein the sensor device is a light detection and ranging (Lidar) system or a Radar system.

6. The vehicle computing system of claim 1, wherein the vehicle is an autonomous vehicle.

7. The vehicle computing system of claim 1, wherein the vehicle is a truck.

8. An autonomous vehicle comprising:
at least one least one Lidar sensor unit configured to:
obtain point data output by a first channel from among a plurality of channels of the Lidar sensor unit, the point data comprising a plurality of respective raw intensity values for a plurality of data points; and
one or more processors configured to:
determine a reflectivity value for an expected surface type for at least a subset of data points of the plurality of data points based on the raw intensity values for the subset of data points;
generate normalized point data for the first channel of the plurality of channels of the Lidar sensor unit based on the reflectivity value for the expected surface type for the subset of data points; and
perform one or more operations for the autonomous vehicle based on the normalized point data;
wherein generating normalized point data for the first channel of the Lidar sensor unit comprises:
calculating a particular intensity value based on the plurality of raw intensity values;
generating an intensity normalization multiplier for the first channel based on the particular intensity value;
determining a normalized intensity value for the normalized point data based on the intensity normalization multiplier, wherein the normalized point data comprises subsequent point data output by the first channel; and
recalculating the intensity normalization multiplier for the first channel at a subsequent time interval to account for a change in a temperature of an environment of the Lidar sensor unit.

9. The vehicle computing system of claim 1, wherein the operations further comprise:
recalculating the intensity normalization multiplier for the first channel to account for a change in alignment of an emitter and a detector in the first channel.

10. A light detection and ranging (Lidar) system for a vehicle, the Lidar system comprising:

at least one Lidar sensor unit configured to:

obtain point data output by a first channel from among a plurality of channels of the Lidar sensor unit, the point data comprising a plurality of respective raw intensity values for a plurality of data points associated with the first channel; and one or more processors configured to:

determine a reflectivity value for an expected surface type for at least a subset of data points of the plurality of data points based on the raw intensity values for the subset of data points;

generate normalized point data for the first channel of the Lidar sensor unit based on the reflectivity value for the expected surface type for the subset of data points; and provide the normalized point data to a computing system of an autonomous vehicle;

wherein generating normalized point data for the first channel of the Lidar sensor unit comprises:

calculating a particular intensity value based on the plurality of raw intensity values;

generating an intensity normalization multiplier for the first channel based on the particular intensity value;

determining a normalized intensity value for the normalized point data based on the intensity normalization multiplier, wherein the normalized point data comprises subsequent point data output by the first channel; and recalculating the intensity normalization multiplier for the first channel at a subsequent time interval to account for a change in a temperature of an environment of the Lidar sensor unit.

11. The Lidar system of claim 10, wherein determining the reflectivity value for the expected surface type for at least the subset of data points of the plurality of data points comprises:

accessing a reference data structure comprising one or more historic data points corresponding to the expected surface type; and determining the expected surface type based on the reference data structure.

12. The Lidar system of claim 10, wherein the reflectivity value is a ground truth reflectivity value for the expected surface type, the ground truth reflectivity value comprising a known measure of a reflective characteristic of the expected surface type.

13. The Lidar system of claim 10, wherein generating normalized point data for the first channel of the Lidar sensor unit comprises:

recalculating the intensity normalization multiplier for the first channel to account for a change in alignment of an emitter and a detector in the first channel.

14. The Lidar system of claim 10, wherein the at least one Lidar sensor unit is further configured to obtain point data output by a second channel from among the plurality of channels of the Lidar sensor unit, the point data output by the second channel comprising a plurality of data points associated with the second channel, and wherein the one or more processors are further configured to generate normalized point data for the second channel of the Lidar sensor unit based on a reflectivity value for an expected surface type for at least a subset of data points associated with the second channel.

15. The autonomous vehicle of claim 8, wherein the one or more operations for the autonomous vehicle comprise predicting a future location of an object within an environment of the autonomous vehicle.

16. The autonomous vehicle of claim 8, wherein generating normalized point data for the first channel of the plurality channels of the Lidar sensor unit comprises:

recalculating the intensity normalization multiplier for the first channel to account for a change in alignment of an emitter and a detector in the first channel.

17. The autonomous vehicle of claim 8, wherein the one or more operations for the autonomous vehicle comprise determining a motion path for the autonomous vehicle.

18. The autonomous vehicle of claim 17, wherein the one or more operations for the autonomous vehicle further comprise controlling the autonomous vehicle based on the motion path.

19. The autonomous vehicle of claim 8, wherein the one or more operations for the autonomous vehicle comprise localizing the autonomous vehicle within an environment of the autonomous vehicle.

20. The autonomous vehicle of claim 8, wherein the one or more operations for the autonomous vehicle comprise identifying an object within an environment of the autonomous vehicle.

* * * * *